United States Patent
Mathan et al.

(10) Patent No.: US 7,835,581 B2
(45) Date of Patent: Nov. 16, 2010

(54) NEUROPHYSIOLOGICALLY DRIVEN HIGH SPEED IMAGE TRIAGE SYSTEM AND METHOD

(75) Inventors: Santosh Mathan, Minneapolis, MN (US); Patricia M. Ververs, Ellicott City, MD (US); Michael C. Dorneich, St. Paul, MN (US); James C. Carciofini, Centerville, MN (US); Stephen D. Whitlow, Saint Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 1113 days.

(21) Appl. No.: 11/513,723

(22) Filed: Aug. 30, 2006

(65) Prior Publication Data

US 2008/0056611 A1    Mar. 6, 2008

(51) Int. Cl.
*G06K 9/62* (2006.01)
*G06K 9/00* (2006.01)

(52) U.S. Cl. ........................ 382/224; 382/254
(58) Field of Classification Search ................. 382/225
See application file for complete search history.

(56) References Cited

U.S. PATENT DOCUMENTS 5,646,342 A * 7/1997 Hagenes .............. 73/152.02
6,293,904 B1 * 9/2001 Blazey et al. ............. 600/26
6,421,463 B1 * 7/2002 Poggio et al. ............. 382/224

OTHER PUBLICATIONS

Sajda, P.; Gerson, A.; Parra, L., "Spatial signatures of visual object recognition events learned from single-trial analysis of EEG," Engineering in Medicine and Biology Society, 2003. Proceedings of the 25th Annual International Conference of the IEEE , vol. 3, No., pp. 2087-2090 vol. 3, Sep. 17-21, 2003.*
A. Gerson, L. Parra, P. Sajda, "Cortically Coupled Computer Vision for Rapid Image Search," IEEE Transactions on Neural Systems and Rehabilitation Engineering, vol. 14, 2006.
M. Santosh, M. Pavel, S. Whitlow, P. Ververs, D. Erdogmus, M. Dorneich, "Neurophysiologically Driven Image Triage: A Pilot Study," CHI 2006, Apr. 22-27, 2006, pp. 1-6.
S. Mathan, T. Ververs, M. Dorneich, S. Whitlow, J. Carciofini, "Neurotechnology for Image Analysis: Searching for Needles in Haystacks Efficiently.", 2006.

* cited by examiner

*Primary Examiner*—Bhavesh M Mehta
*Assistant Examiner*—Hadi Akhavannik
(74) *Attorney, Agent, or Firm*—Ingrassia Fisher & Lorenz, P.C.

(57) ABSTRACT

A system and method of efficiently and effectively triaging an image that may include one or more target entities. The image is divided into a plurality of individual image chips, and each image chip is successively displayed to a user for a presentation time period. Data are collected from the user at least while each image chip is being displayed. For each image chip, a probability that the image chip at least includes a target entity is assigned, based at least in part on the collected data. The image is then displayed with the assigned probabilities overlaid thereon.

25 Claims, 4 Drawing Sheets

NEUROPHYSIOLOGICALLY DRIVEN HIGH SPEED IMAGE TRIAGE SYSTEM AND METHOD

STATEMENT REGARDING FEDERALLY SPONSORED RESEARCH OR DEVELOPMENT

This invention was made with Government support under contract HM1582-05-C-0046 awarded by the Defense Advanced Research Projects Agency (DARPA) and the National Geospatial Intelligence Agency (NGA). The Government has certain rights in this invention.

TECHNICAL FIELD

The present invention generally relates to a system and method for efficiently conducting image triage and, more particularly, to a system and method for conducting high speed image triage using rapid serial visual presentation.

BACKGROUND

Analysts in various professions may, at times, be called upon to search relatively large collections of imagery to identify, if present, various types of relevant information (referred to herein as "a target entity" or "target entities") in the collection of imagery. For example, medical analysts sometimes diagnose a physical impairment by searching complex imagery collections to identify one or more target entities therein that may be the cause of the physical impairment. Moreover, intelligence analysts may be called upon to search relatively complex imagery collections to identify target entities therein that may relate to various types of intelligence gathering activities.

Advancements in both image collection and storage technology presently allow for the relatively low-cost storage of large volumes of high-quality imagery. However, the cost of searching through large sets of imagery for target entities can often be substantial. Indeed, in many professions, such as intelligence gathering, effective searching may rely on the expertise of highly skilled analysts, who typically search through relatively large sequences of images in a relatively slow manner. Presently, the number of skilled analysts available to search the amount of imagery that is stored, or can potentially be stored, is in many instances insufficient.

In response to the foregoing, there has relatively recently been a focus on developing various systems and methods for triaging imagery. One of the methods that has shown promise combines electroencephalography (EEG) technology and rapid serial visualization presentation (RSVP). Various implementations of this combination have been researched and developed. For example, researchers at Columbia University have experimented with a system in which users are presented, using the RSVP paradigm, a sequence of images, some of which may include particular types of target entities. During the RSVP presentation, EEG data are collected from the users. A classifier then uses the collected EEG data to assign probabilities to each image. The probabilities are representative of the likelihood an image includes a target. These assigned probabilities are then used to sort the presented images, placing those images most likely to include a target entity near the beginning of the image sequence.

Although useful in sorting a sequence of images, the above described system and method, as well as other systems and methods that employ these same technologies, do suffer certain drawbacks. For example, if the above-described image triage system and method is applied to a broad area image, it will not provide an analyst with information regarding the locations of potential targets within the context of the original broad area image. Rather, it will merely reorder the manner in which the broad area image is presented to the user. Various other systems and methods also fail to provide such location context information. Thus, once individual images from a sequence of images are identified as being most likely to include a target entity, each of those individual images will likely need to be carefully analyzed by an image analyst.

Hence, there is a need for an efficient and effective system and method for triaging individual images for target entities. Namely, a system and method that can be used to rapidly screen high volumes of imagery, including individual images, and identify a subset of images, or sections of individual images, that merit more detailed scrutiny by a skilled analyst. The present invention addresses at least this need.

BRIEF SUMMARY

The present invention provides an efficient and effective image triage system and method. In one embodiment, and by way of example only, a method of conducting image triage of an image that may include one or more target entities includes dividing the image into a plurality of individual image chips, and successively displaying each image chip to a user for a presentation time period. Data are collected from the user at least while each image chip is being displayed. For each image chip, a probability that the image chip at least includes a target entity is assigned, based at least in part on the collected data. The image is then displayed with the assigned probabilities overlaid thereon.

In yet another exemplary embodiment, a system for conducting image triage of an image that may include one or more target entities includes a display, a data collector, and a processor. The display device is operable to receive display commands and, in response thereto, to display an image. The data collector is configured to at least selectively collect data from a user. The processor is coupled to receive the collected data from the data collector. The processor is further coupled to the display device and is configured to selectively retrieve an image, divide the image into a plurality of individual image chips, successively command the display device to display each image chip to a user for a presentation time period, assign a probability, which is representative of a likelihood that the image chip at least includes a target entity, to each displayed image chip based at least in part on the collected data, and display the image with the assigned probabilities overlaid thereon.

Furthermore, other desirable features and characteristics of the image triage system and method will become apparent from the subsequent detailed description and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description.

Figure 1:
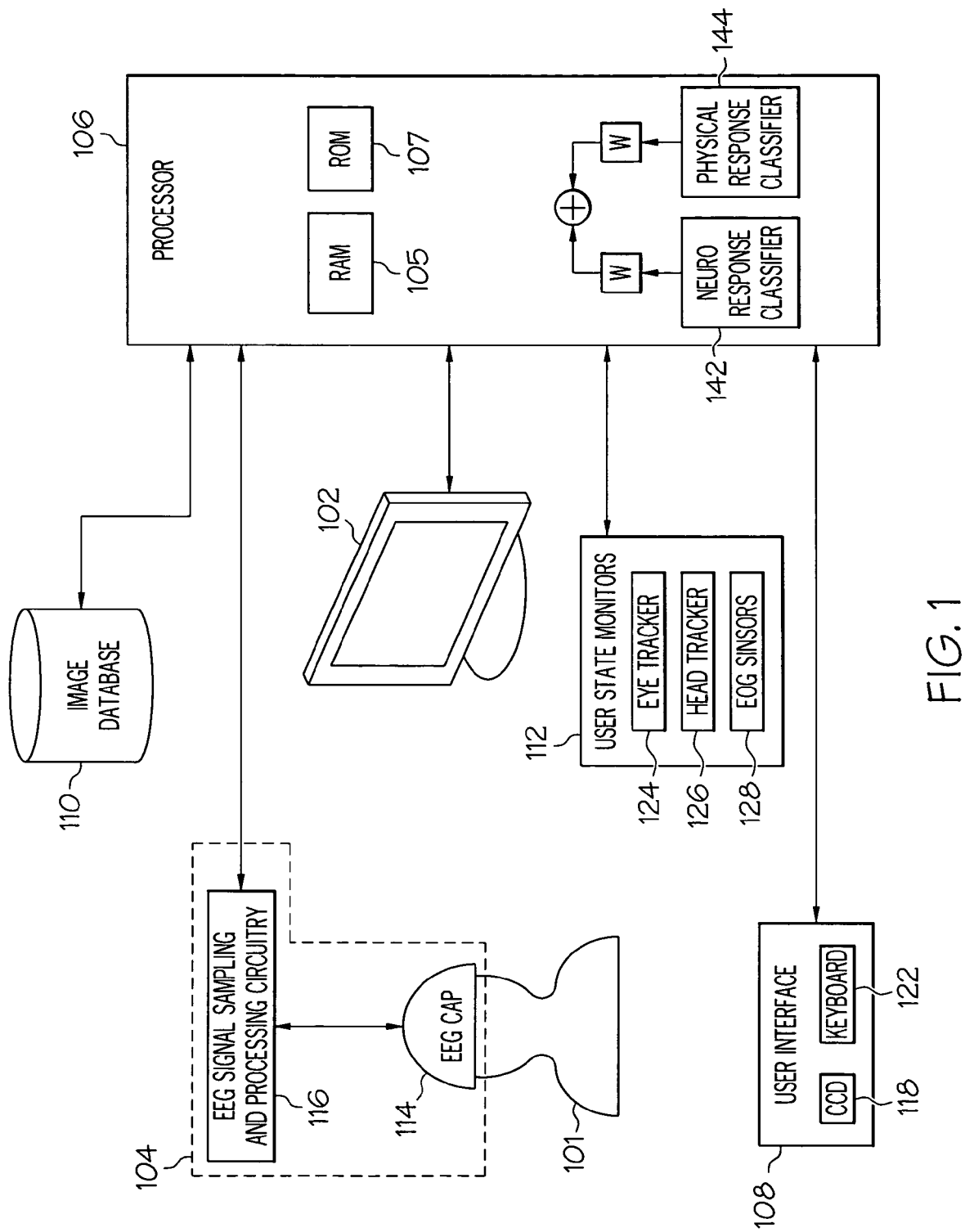
FIG. 1 depicts a functional block diagram of an exemplary image triaging system.

Turning first to FIG. 1, a functional block diagram of an exemplary system 100 that may be used to triage images is depicted. The depicted system 100 includes a display device 102, a data collector 104, and a processor 106. As FIG. 1 further depicts, in some embodiments the system 100 may additionally include a user interface 108, an image database 110, and one or more user state monitors 112. The display device 102 is in operable communication with the processor 106 and, in response to display commands received therefrom, displays one or more images to a user 101. It will be appreciated that the display device 102 may be any one of numerous known displays suitable for rendering graphic, icon, and/or textual images in a format viewable by the user 101. Non-limiting examples of such displays include various cathode ray tube (CRT) displays, and various flat panel displays such as, for example, various types of LCD (liquid crystal display) and TFT (thin film transistor) displays. The display may additionally be based on a panel mounted display, a head up display (HUD) projection, or any known technology.

The data collector 104 in the depicted embodiment is a neurophysiological data collector that is configured to be disposed on, or otherwise coupled to, the user 101, and is operable to selectively collect neurophysiological data from the user 101. Preferably, and as depicted in FIG. 1, the neurological data collector 104 is implemented as an electroencephalogram (EEG) system, and most preferably as a multichannel EEG cap 114, and appropriate EEG signal sampling and processing circuitry 116. Although the number of channels may vary, in a particular physical implementation a 32-channel EEG cap 114 is used. Moreover, the EEG signal sampling and processing circuitry 116 may be implemented using any one of numerous known suitable circuits and devices including, for example, one or more analog-to-digital converters (ADC), one or more amplifiers, and one or more filters. For example, in a particular physical implementation, portions of the ActiveTwo system developed and marketed by BioSemi of Amsterdam, Netherlands, and an eighth-order Butterworth digital bandpass filter, with a pass band between about 1 Hz and 30 Hz, is used. No matter the particular type of EEG signal sampling and processing circuitry 116 that is used, it is in operable communication with, and is configured to supply the collected EEG data to, the processor 106. As will be described in more detail further below, the EEG signal sampling and processing circuitry 116 is further configured to receive trigger signals from the processor 106, and to record the receipt of these trigger signals concurrently with the EEG signals.

The user interface 108 is in operable communication with the processor 106 and is configured to receive input from the user 101 and, in response to the user input, supply various signals to the processor 106. The user interface 108 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 118 and a keyboard 122. The user 101 may use the CCD 118 to, among other things, move a cursor symbol on the display device 102, and may use the keyboard 122 to, among other things, input various data. As will be described further below, the user 101 may additionally use either the CCD 118 or keyboard 122 to selectively supply physical response data, the purpose of which are also described further below.

The one or more user state monitors 112 are operable to selectively collect various data associated with the user 101. Preferably, and as depicted in FIG. 1, the one or more user state monitors 112 include at least an eye tracker 124, a head tracker 126, and one or more EOG (electrooculogram) sensors 128. The eye tracker 124 is configured to detect the movement of one or both of the user's pupils, the head tracker 126 is configured to detect the movement and/or orientation of the user's head, and the EOG sensors 128 are used to detect eye blinks and various eye movements of the user 101. Although any one of numerous devices may be used to implement the eye tracker 124 and head tracker 126, in the depicted embodiment one or more appropriately mounted and located video devices, in conjunction with appropriate processing software components are used to implement these functions. Though not explicitly depicted in FIG. 1, appropriate signal sampling and processing circuitry, if needed or desired, may be coupled between the eye tracker 124 and/or the head tracker 126 and the processor 106. Moreover, the same or similar signal sampling and processing circuitry 116 that is used with the EEG cap 114 may additionally be used to supply appropriate EOG signals to the processor 106. It will be appreciated that, at least in some embodiments, the system 100 may be implemented without one or all of the user state monitors 112. No matter which, if any, of the user state monitors 112 that are included in the system 100, each supplies appropriate user state data to the processor 106.

The processor 106 is in operable communication with the display device 102, the neurophysiological data collector 104, the user interface 108, and the image database 110 via, for example, one or more communication buses or cables 136. The processor 106 is coupled to receive neurophysiological data from the neurophysiological data collector 104. As noted above, the processor 106 may additionally receive physical response data from the user interface 108. As will be described in more detail further below, the processor 106, based at least in part on one or more of these data, assigns probabilities to discrete sections of an image. The assigned probabilities are representative of the likelihood that the discrete sections of the image include a target entity. As will also be described in more detail further below, the processor 106 additionally displays the image with the assigned probabilities overlaid thereon.

It was additionally noted above that the processor 106, at least in some embodiments, may also receive user state data from the one or more user state monitors 112. In such embodiments, the processor 106 appropriately processes the user data and the neurophysiological data to determine whether one or more of these data, either alone or in combination, indicate the user 101 is in a state that could adversely compromise the effectiveness of the image triage processing, which is described in more detail further below. It is noted that, based on this determination, the processor 106 may generate one or more user alerts and/or vary the pace of one or more portions of the below-described image triage processing.

The processor 106 may include one or more microprocessors, each of which may be any one of numerous known general-purpose microprocessors or application specific processors that operate in response to program instructions. In the depicted embodiment, the processor 106 includes on-board RAM (random access memory) 105, and on-board ROM (read only memory) 107. The program instructions that control the processor 106 may be stored in either or both the RAM 105 and the ROM 107. For example, the operating system software may be stored in the ROM 107, whereas various operating mode software routines and various operational parameters may be stored in the RAM 105. It will be appreciated that this is merely exemplary of one scheme for storing operating system software and software routines, and that various other storage schemes may be implemented. It will also be appreciated that the processor 106 may be implemented using various other circuits, not just one or more programmable processors. For example, digital logic circuits and analog signal processing circuits could also be used.

The image database 110 preferably has various types of imagery collections stored therein. The imagery collection types may vary, and may include, for example, various types of static imagery and various types of video imagery. It will additionally be appreciated that, although the image database 110 is, for clarity and convenience, shown as being stored separate from the processor 106, all or portions of this database 110 could be loaded into the on-board RAM 105, or integrally formed as part of the processor 106, and/or RAM 105, and/or ROM 107. The image database 110, or the image data forming portions thereof, could also be part of one or more non-illustrated devices or systems that are physically separate from the depicted system 100.

Figure 2:
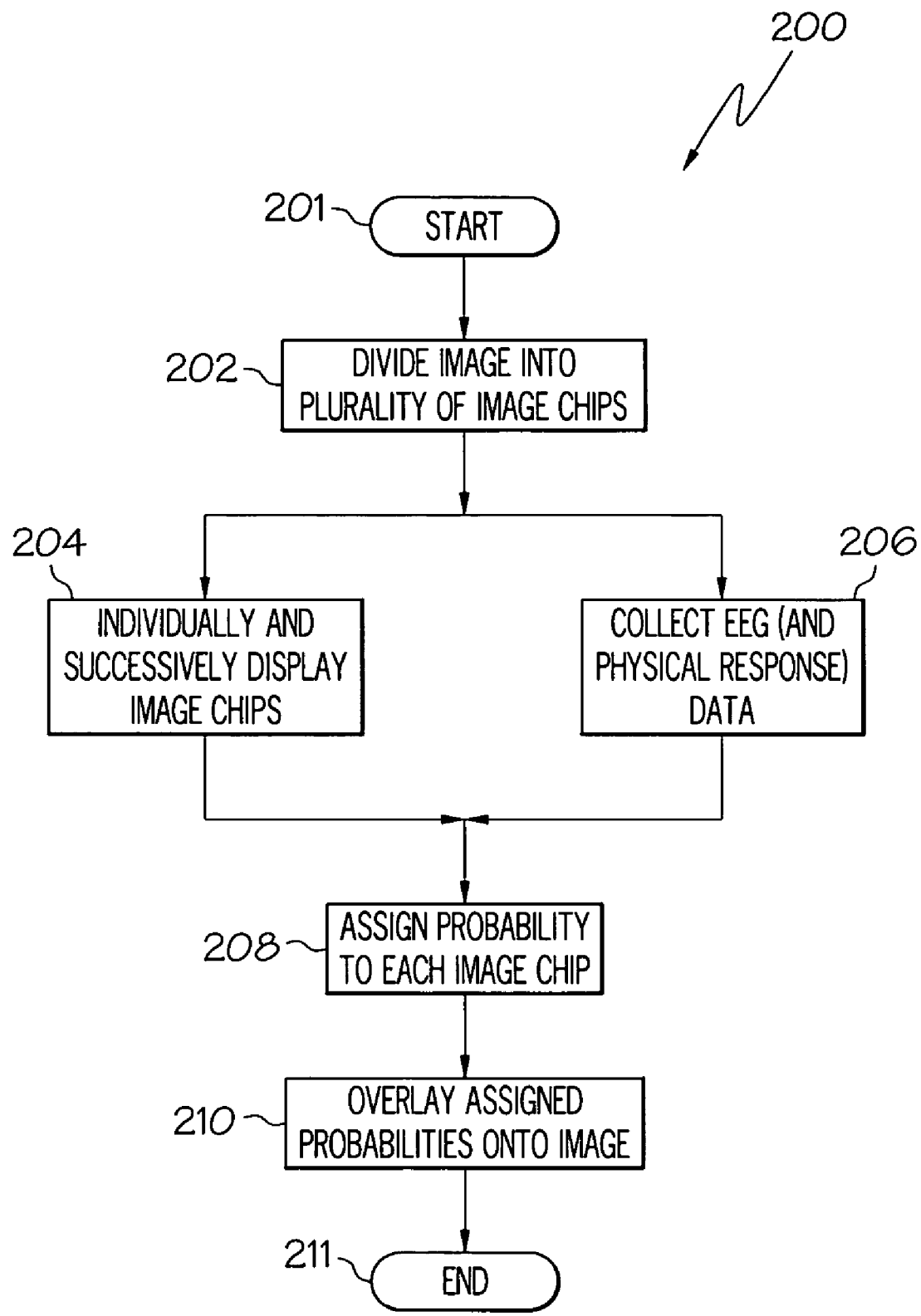
FIG. 2 depicts an exemplary process, in flowchart form, that may be implemented by the image triaging system of FIG. 1.

As was previously noted, the processor 106 receives either neuophysiological data, physical response data, or both, and may additionally receive user state data. The processor 106, based at least in part on one or more of these data, assigns probabilities to discrete sections of an image. These assigned probabilities are representative of the likelihood that these discrete sections of the image include a target entity. As was also noted above, the processor 106 also commands the display device 112 to display the image with the assigned probabilities overlaid thereon. The overall process 200 by which the processor 106 implements these outcomes is depicted in flowchart form in FIG. 2, and with reference thereto will now be described in more detail. Before doing so, however, it is noted that the depicted process 200 is merely exemplary of any one of numerous ways of depicting and implementing the overall process to be described. Moreover, before the process 200 is initiated, it is noted that, if neurophysioligical data are collected, at least the neurophysiological data collector 104 has preferably been properly applied to the user 101, and appropriately configured to collect neurophysiological data. If included, the one or more user monitors 112 have also preferably been applied to the user 101, and appropriately configured to collect user state data. With this background in mind, it is additionally noted that the numerical parenthetical references in the following description refer to like steps in the flowchart depicted in FIG. 2.

Figure 3:
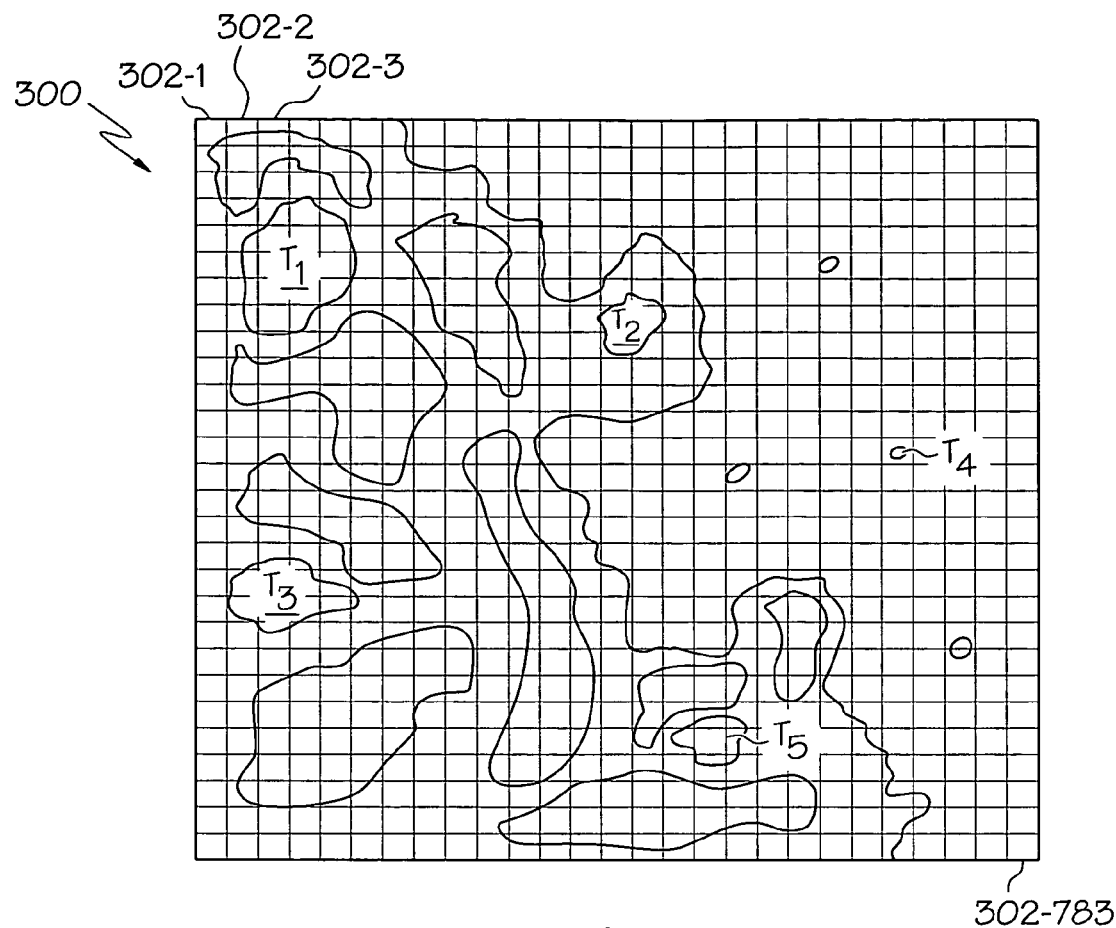
FIG. 3 depicts how an image may be divided into individual image chips, in accordance with a particular embodiment of the present invention.

Turning now to the description of the process 200, it is seen that when an image is retrieved from the image database 110, the processor 106, and most notably the appropriate software being implemented by the processor 106, divides the retrieved image into a plurality of smaller discrete sub-images (202). More specifically, and with reference to FIG. 3, the retrieved image 300, which in the depicted embodiment is a simplified representation of a broad area image of a port region, is divided into N-number of discrete sub-images, which are referred to herein as image chips 302 (e.g., 302-1, 302-2, 302-3, . . . 302-N). It will be appreciated that the number of image chips 302 that a retrieved image 300 may be divided into may vary, and may depend, for example, on the size and/or resolution of the retrieved image 300. In the embodiment depicted in FIG. 3, the retrieved image 300 is divided into 783 image chips (i.e., N=783).

Returning once again to FIG. 2, after the image 300 has been divided into the plurality of image chips 302, the image chips 302 are individually and successively displayed, on the display device 102, to the user 101 (204). In particular, the image chips 302 are preferably presented using a rapid serial visualization presentation (RSVP) technique. Thus, each image chip 302 is individually displayed, preferably at the same location on the display device 102, for a presentation time period, preferably in a predetermined sequence, and preferably at substantially equivalent luminance levels. The presentation time period of the image chips 302, which is referred to herein as the RSVP rate, may vary, and may be selected by the user 101. In a particular preferred embodiment, the RSVP rate is selectable by the user 101, via the user interface 108, to rates ranging from about 75 milliseconds to about 200 milliseconds per image chip 302.

Figure 4:
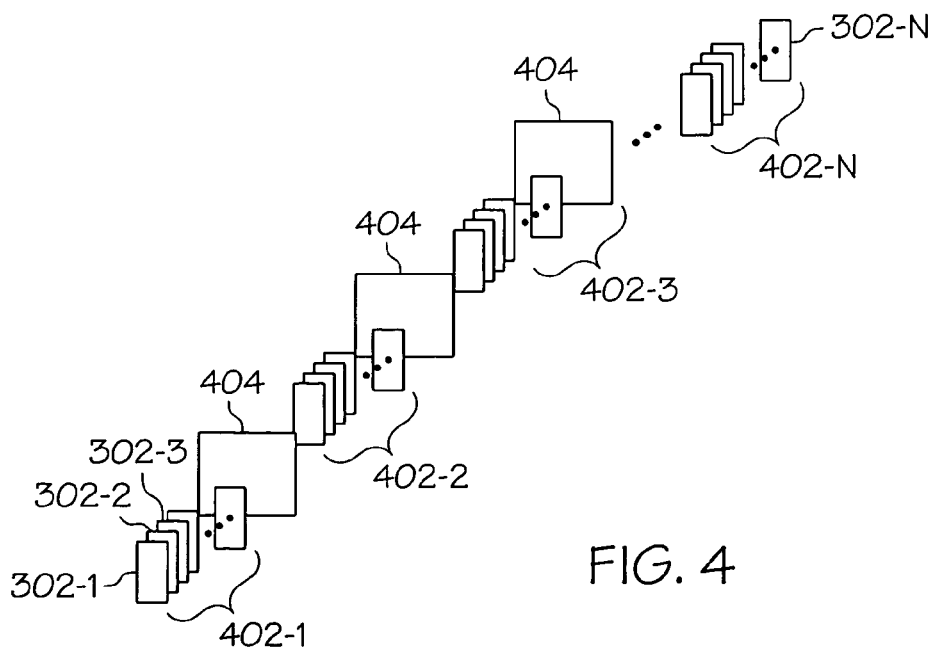
FIG. 4 illustrates a particular rapid serial visualization presentation paradigm that may be implemented in accordance with an embodiment of the present invention.

It will additionally be appreciated that the image chips 302 may be individually and successively displayed in accordance with any one of numerous paradigms. For example, the image chips 302 could be successively and sequentially displayed to the user 101 from the first image chip 302-1 to the N-th image chip 302-N in an uninterrupted manner. However, in a particular preferred implementation, which is depicted more clearly in FIG. 4, the image chips 302 are divided into image chip groups 402 (e.g., 402-1, 402-2, 402-3, . . . 402-N), with each image chip group 402 including a subset of the total number of image chips 302. The image chips 302 in each image chip group 402 are displayed to the user 101, at the RSVP rate. In addition, as FIG. 4 further depicts, a fixation screen 404 is displayed to the user 101 for a predetermined relaxation time period between the successive display of the image chips 302 in each image chip group 402. The fixation screen 404 may display any one of numerous images, but in a preferred embodiment the fixation screen 404 is at least substantially devoid of imagery. The fixation screen 404 is displayed for the relaxation time period to break the potential monotony of this portion of the process 200 and to minimize potential eye strain to the user 101. It will be appreciated that the relaxation time period may vary, and may additionally be selected by the user 101. It will additionally be appreciated that the relaxation time period may be controlled automatically based, for example, on the collected user state data. For example, if the collected user state data indicates that the user 101 may be in a less attentive state, the relaxation time period may be increased. In a particular preferred embodiment, the relaxation time period may vary from about 1 second to about 5 seconds.

Returning once again to FIG. 2, it is seen that while the image chips 302 are being displayed to the user 101, data such as, neurophysiological data, physical response data, or both, are collected from the user 101 (206). As was noted above, in some embodiments, user state data may additionally be collected via the user interface 108 and the one or more state monitors 112, respectively. As was also previously noted, if neurophysiological data are collected, these data are preferably EEG data collected via the multi-channel EEG cap 114. It will be appreciated that, if collected, either the CCD 118 or the keyboard 122 may be used to collect the physical response data. In particular, the user 101 will hit either a predetermined button on the CCD 118 or a predetermined key on the keyboard 122 each time the user 101 believes a displayed image chip 302 includes a target entity, or at least a portion of a target entity. In the depicted embodiment, the image 300 includes five target entities that, for simplicity of illustration, are labeled $T_1$ through $T_5$ on FIG. 3. It will be appreciated that in an actual physical implementation, the image 300 may include any number of target entities, and may be, for example, various types of land vehicles, seagoing vessels, special use land masses, weapons sites, or military bases, just to name a few examples. In the remainder of the description of the process 200, it is assumed that at least neurophysiological data are collected.

During neurophysiolgical data collection, the processor 106, as previously noted, supplies image triggers, or brief pulses, to the neurophysiological data collector 104. The image triggers are supplied each time an image chip 302 is displayed. During subsequent processing, which is described further below, a segment of neuophysiological data and a segment physical response data are extracted around each image trigger. These segments, referred to as epochs, contain neuophysiological data and physical response data from a predetermined time before an image trigger to a predetermined time after the image trigger. Although the predetermined time period before and after each image trigger may vary, and concomitantly the total length of each epoch of data, in a particular preferred embodiment the predetermined time period is about 1.0 second before and after each image trigger. Thus, an epoch of neurophysiological data and an epoch of physical response data are each about 2.0 seconds in length.

For completeness, before describing the remainder of the overall process 200 some of the prior research regarding EEG data, including that of the instant inventors, that has led to the instant invention will be described.

It is now generally known in the technological field of this application that EEG sensors detect brain signals known as an evoked response potential (ERP), within about 150 milliseconds of an image that includes a target entity being displayed. The inventors of the instant invention have additionally shown that spatial integration of EEG data, such as ERPs, around a window of a few hundred milliseconds following the display of an image with a target entity can provide a basis for accurate single trial ERP detection. In particular, the instant inventors have discovered that a clear pattern of spatio-temporal EEG activity exists approximately 250 milliseconds following stimulus onset (e.g., the display of an image), and that this pattern can be used to discriminate between images that include one or more target entities (e.g., "target images") and images that do not include target entities (e.g., "distractor images").

With the above background in mind, the remaining portion of the process 200 will now be described. Returning once again to FIG. 2, it is seen that after the neurophysiological data are collected and, in some embodiments, the physical response data and/or the user state data are collected, a probability is assigned to each image chip 302 (208). The probability that is assigned to each image chip 302 is based on these collected data, either alone or in combination, and is representative of the likelihood that the image chip 302 includes a target entity. It is noted that in a particular preferred embodiment, an epoch of neurophysiological data and an epoch of physical response data associated with each image chip 302 are supplied to two separate classifiers, one associated with each data type. As will be described below, the outputs of the classifiers are used to determine the probability to be assigned to each image chip 302.

The classifiers are preferably each trained classifiers associated with the user 101 and, as depicted in FIG. 1, include a neurophysiological classifier 142 and a physical response classifier 144. Although any one of numerous known classifiers may be used, in a particular preferred embodiment, a support vector machine (SVM) is used to implement each classifier 142, 144. It will be appreciated that any one of numerous types of SVMs may be used to implement the system 100, but in a particular preferred embodiment non-linear SVMs with a radial basis function kernel are used. It is generally known that an SVM is a linear machine learning technique that uses various statistical learning theory concepts to provide generalization performance. It is also known that SVMs may be used to project data that are not linearly separable into a higher dimensional space where the data may be linearly separable.

No matter the particular specie or sub-specie of classifiers that are used, each classifier 142, 144 determines the probability that an image chip 302 includes a target entity. The outputs from the two classifiers 142, 144 are then combined using a weighted combination of each classifier 142, 144 to generate combined values. For example, in a particular preferred embodiment the outputs of the neurophysiological classifier 142 are weighted twice as high as the outputs of the physical response classifier 144. It will be appreciated that the specific and relative weighting of the classifier outputs may vary, and that weighting the outputs of the neurophysiological classifier 142 twice as high as the outputs of the physical response classifier 144 is merely exemplary. Nonetheless, in the depicted embodiment, the combined values are scaled to provide values between 0.0 and 1.0 for each image chip 302, which are representative of the probability that each image chip 302 includes a target entity.

Figure 5:
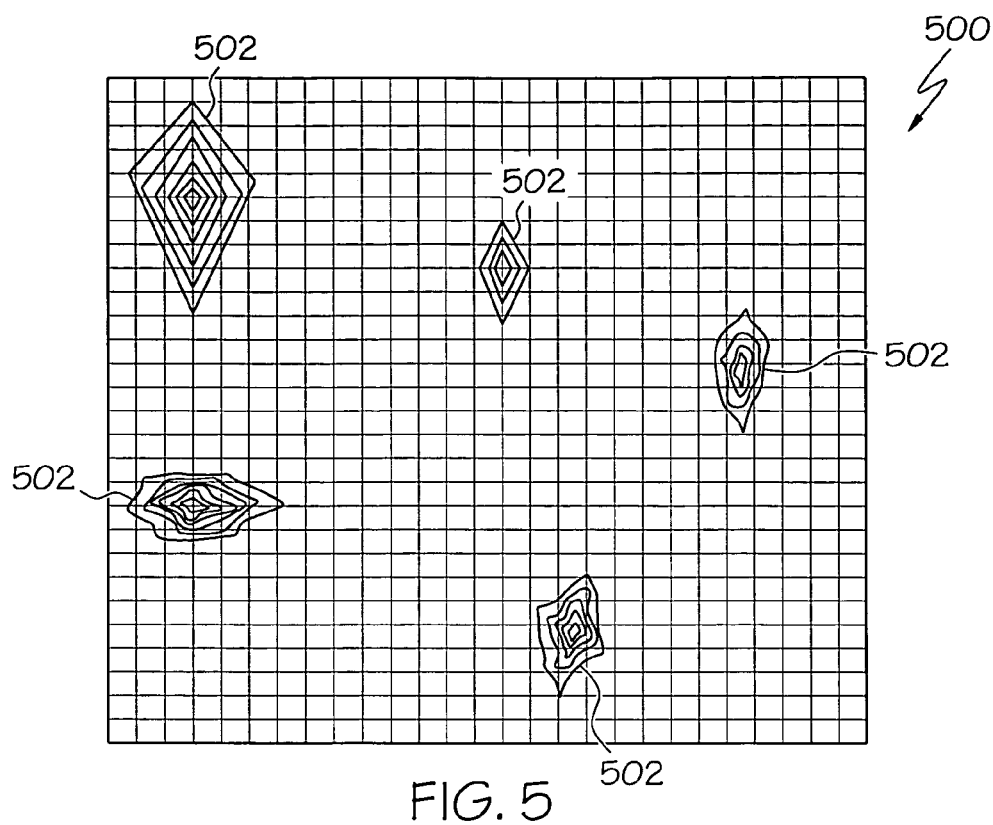
FIG. 5 depicts a contour map that displays regions of an original image likely to include a target may be generated in accordance with an embodiment of the present invention.
Figure 6:
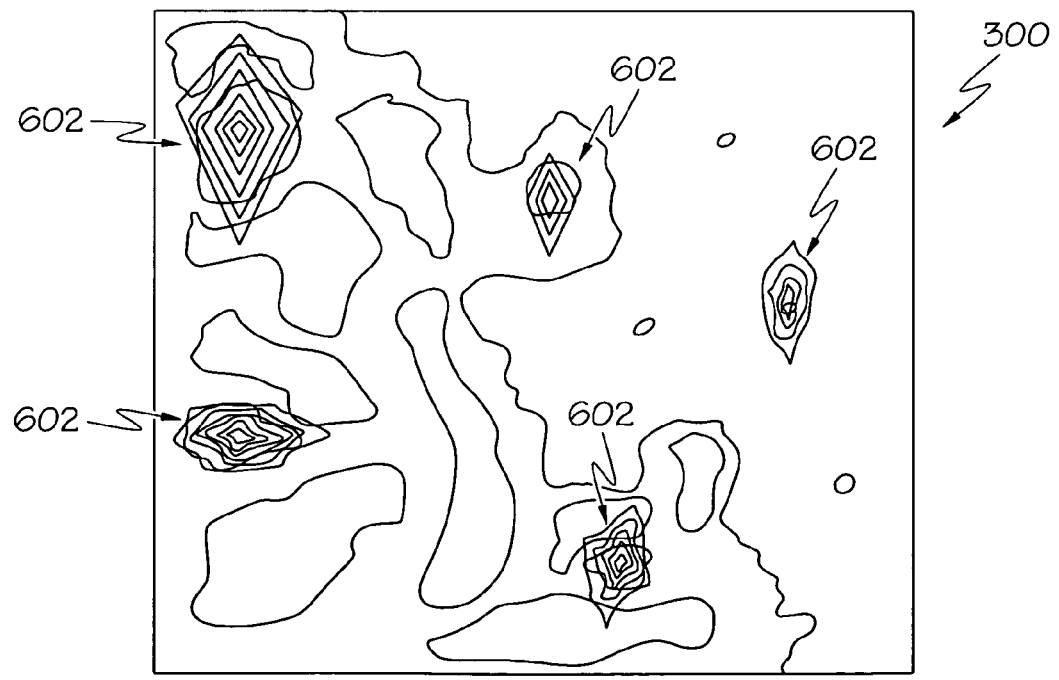
FIG. 6 depicts the contour map of FIG. 5 overlaid onto an original image.

Returning yet again to FIG. 2, it is seen that once the probabilities are assigned to each image chip 302 (208), the assigned probabilities are overlaid onto the original image 300 (210). More specifically, and with reference now to FIG. 5, a contour map 500 that depicts regions of the original image likely to include a target may be generated based on the assigned probabilities. As FIG. 5 depicts, the contour map 500 includes one or more contour clusters 502. The contour clusters 502 indicate the most likely sections of the original image 300 to include a target entity. Preferably, and as shown in FIG. 6, the contour map 500 is overlaid onto the original image 300 and displayed on the display device 102. Thus, the user 101 is provided with information regarding locations 602 within the original image 300 most likely to include a target entity. These locations 602 within the original image 300 may then be more closely scrutinized by a trained analyst, which may also be the user 101, by, for example, zooming in on these locations 602 within the image 300.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of conducting image triage of an image that may include one or more target entities, comprising:
dividing the image into a plurality of individual image chips;
successively displaying each image chip to a user for a presentation time period;
collecting neurophysiological data and physical response data from the user at least while each image chip is being displayed;
for each image chip, assigning a first probability that the image chip at least includes a target entity, based on the collected physical response data;
for each image chip, assigning a second probability that the image chip at least includes a target entity, based on the collected neurophysiological data;
applying a weighting factor to the second probability;
for each image chip, determining and assigning an overall probability from a combination of the first probability and the weighted second probability; and
displaying the image with the assigned probabilities overlaid thereon.

2. The method of claim 1, further comprising:
generating a contour map that includes data representative of the probability assigned to each image chip.

3. The method of claim 2, wherein the step of displaying the image with the assigned probabilities overlaid thereon comprises displaying the image with the generated contour map overlaid thereon.

4. The method of claim 1, wherein the image chips are successively displayed to the user in accordance with a rapid serial visualization (RSVP) paradigm at a preselected RSVP rate.

5. The method of claim 4, wherein the preselected RSVP rate ranges from about 75 milliseconds per image chip to about 200 milliseconds per image chip.

6. The method of claim 1, wherein the step of successively displaying the image chips comprises:
dividing the image chips into image chip groups, each image chip group including a subset of the plurality of image chips;
successively displaying the image chips in a each image chip group to the user for the presentation time period; and
displaying a predetermined fixation image to the user for a predetermined relaxation time period between the successive display of the image chips in each image chip group.

7. The method of claim 1, further comprising:
collecting the neurophysiological data and the physical response data from the user from a predetermined time period before an image chip is displayed to a predetermined time period after the image chip is displayed.

8. The method of claim 7, wherein the predetermined time period before an image chip is displayed and the predetermined time period after an image chip is displayed are each about 1.0 second.

9. The method of claim 1, further comprising:
supplying the collected neurophysiological data and the collected physical response data to a first classifier and a second classifier, respectively, for assignment of the first and second probabilities, respectively.

10. The method of claim 9, wherein the first and second classifiers each comprise a support vector machine (SVM).

11. The method of claim 10, wherein the first and second classifiers each comprise trained SVMs associated with the user.

12. The method of claim 1, further comprising:
monitoring one or more states of the user; and
supplying one or more alerts to the user based on the one or more states of the user,
wherein the monitored states of the user include one or more of user attention lapses, eye activity, and head movements.

13. A system for conducting image triage of an image that may include one or more target entities, comprising:
a display device operable to receive display commands and, in response thereto, to display an image;
a data collector comprising a neurophysiological data collector configured to at least selectively collect neurophysiological data from a user and a user interface configured to receive input stimulus from the user and, in response thereto, to supply physical response data;
processor coupled to receive the collected data from the data collector, the processor further coupled to the display device and configured to:
selectively retrieve an image,
divide the image into a plurality of individual image chips,
successively command the display device to display each image chip to a user for a presentation time period,
implement a first classifier and a second classifier, the first classifier configured to assign a first probability to each image chip based on the collected physical response data, the second classifier configured to assign a second probability to each image chip based on the collected neurophysiological data
apply a weighting factor to the second probability,
determine and assign a probability to each displayed image chip from a combination of the first probability and the weighted second probability, each assigned probability representative of a likelihood that the image chip at least includes a target entity, and
supply commands to the display device that cause the display device to display the image with the assigned probabilities overlaid thereon.

14. The system of claim 13, wherein the processor is further configured to generate a contour map that includes data representative of the probability assigned to each image chip.

15. The system of claim 14, wherein the processor is configured to display the image with the generated contour map overlaid thereon.

16. The system of claim 1, wherein the processor is further configured to successively display the image chips to the user in accordance with a rapid serial visualization (RSVP) paradigm at a preselected RSVP rate.

17. The system of claim 16, wherein the preselected RSVP rate ranges from about 75 milliseconds per image chip to about 200 milliseconds per image chip.

18. The system of claim 13, wherein the processor is further configured to:
divide the image chips into image chip groups, each image chip group including a subset of the plurality of image chips;
supply display commands to the display device that cause the display device to successively display the image chips in a each image chip group to the user for the presentation time period; and
supply display commands to the display device that cause the display device to display a predetermined fixation image to the user for a predetermined relaxation time period between the successive display of the image chips in each image chip group.

19. The system of claim 13, wherein the neurological data collector is configured to collect the data from the user from a predetermined time period before an image chip is displayed to a predetermined time period after the image chip is displayed.

20. The system of claim 19, wherein the predetermined time period before an image chip is displayed and the predetermined time period after an image chip is displayed are each about 1.0 second.

21. The system of claim 13, wherein the processor is further configured to collect the physical response data from a predetermined time period before an image chip is displayed to a predetermined time period after the image chip is displayed.

22. The system of claim 13, wherein:
the collected neurophysiological data and the collected physical response data are supplied to the first classifier and the second classifier, respectively, for assignment of the first and second probabilities, respectively.

23. The system of claim 22, wherein the first and second classifiers each comprise a support vector machine (SVM).

24. The system of claim 23, wherein the first and second classifiers each comprise trained SVMs associated with the user.

25. The system of claim 13, further comprising:
one or more user state monitors configured to monitoring sensor one or more states of the user and supply user state data representative thereof,
wherein:
the processor is further configured to receive the user state data, and to determine the user is in a state that could adversely compromise probability assignment effectiveness, and selectively generate one or more alerts based on the one or more states of the user, and the states of the user include one or more of user attention lapses, eye activity, and head movements.

* * * * *